(12) United States Patent
Mulholland et al.

(10) Patent No.: US 7,552,072 B2
(45) Date of Patent: Jun. 23, 2009

(54) COMPENSATION OF DATA ITEM PROCESSING

(75) Inventors: Alexandra Mulholland, Raleigh, NC (US); Ian Robinson, Swanmore (GB); David John Vines, Romsey (GB)

(73) Assignee: International Business Machines Corporation, Armonk, NY (US)

( * ) Notice: Subject to any disclaimer, the term of this patent is extended or adjusted under 35 U.S.C. 154(b) by 995 days.

(21) Appl. No.: 11/099,305

(22) Filed: Apr. 5, 2005

(65) Prior Publication Data
US 2005/0222946 A1 Oct. 6, 2005

(30) Foreign Application Priority Data
Apr. 6, 2004 (GB) .................... 0407773.1

(51) Int. Cl.
*G06Q 40/00* (2006.01)
(52) U.S. Cl. .......................... 705/35; 705/44
(58) Field of Classification Search ............. 705/10–44; 707/100–104, 7, 8
See application file for complete search history.

(56) References Cited

U.S. PATENT DOCUMENTS

| | | | | |
|---|---|---|---|---|
| 4,717,866 A | * | 1/1988 | Gray | 318/696 |
| 5,222,914 A | * | 6/1993 | Mazziotti | 464/144 |
| 5,924,078 A | * | 7/1999 | Naftzger | 705/16 |
| 5,983,225 A | * | 11/1999 | Anfindsen | 707/8 |
| 6,631,397 B1 | * | 10/2003 | Satomi et al. | 709/203 |
| 6,662,196 B2 | * | 12/2003 | Holenstein et al. | 707/202 |
| 6,986,461 B1 | * | 1/2006 | Geoghegan et al. | 235/382 |
| 7,139,728 B2 | * | 11/2006 | Rigole | 705/26 |
| 7,330,816 B1 | * | 2/2008 | Satomi et al. | 705/1 |

OTHER PUBLICATIONS

Scott D. Stoller, et al , "Transformations for Model Checking Distributed Java Programs" , Computer Science Dept., SUNY at Stony Brook, Stony Brook, NY 11794-4400.*
Samik Basu, (Samik Basu), Scott A. Smolka (State University of New York at Stony Brook), "Model Cheking the JAVA Metalocking Algorithm".*
Christoph von Praun et al., "Static Conflict Analysis for Multi-Threaded Object-Oriented Programs", Laboratory for Software Technology, ETH Zurich, 8092 Zurich, Switzerland.*

* cited by examiner

*Primary Examiner*—Frantzy Poinvil
(74) *Attorney, Agent, or Firm*—Steven L. Nichols; Rader, Fishman & Grauer PLLC

(57) ABSTRACT

A data processing method, apparatus, computer program product, and service for assuring timely execution of compensation for non-transactional work which is carried out in a transaction under which a data item is processed. A lock is taken before the data item is processed and, in the event the transaction fails, the same lock is also obtained before the data item is re-processed. As a result, re-processing of the data item is held until the lock obtained by the failed transaction is released and this is only done once compensation of non-transactional work is complete. Thus, compensation completes before the message is re-processed.

12 Claims, 6 Drawing Sheets

COMPENSATION OF DATA ITEM PROCESSING

FIELD OF THE INVENTION

The present invention relates to compensation processing, and more particularly to compensation of processing carried out for a data item, such as a message.

BACKGROUND

Many modern applications make use of data item driven processing in which the arrival of a data item triggers work to be carried out as a result of processing of the data item. For example, this may be done by putting a message into a Java™ Message Service (JMS) queue which then causes a message-driven bean (MDB) to be invoked to process the message. Note that a message is typically taken off the queue and processed within the scope of a transaction, for example an XA transaction, and the messaging service registers a resource as a participant in the transaction such that it is directed to roll back if the transaction fails. This enables the messaging service to replace a message onto the message queue for reprocessing if the transaction which processed the message fails. Further, processing of a message may involve transactional work carried out by one or more other transactional resources which also register as participants in the transaction. For example, such a resource may represent an update to a database made as part of message processing. Now if the transaction fails, each of the registered participants is directed to roll back so that the message is replaced on the queue, and updates to databases made by the other resources are removed such that all transactional work done by the failed transaction is undone. Note that typically transactions do not provide any ordering for the various enlisted resources and, as a result, the resources may be directed to roll back in any order. (Java and all Java based trademarks are trademarks of Sun Microsystems, Inc. in the United States, other countries, or both).

Further, processing of a message may involve non-transactional work carried out by non-transactional resources, for example sending an e-mail or updating a resource, such as a flat file, which is not transaction-aware (i.e.: cannot register as a participant in the transaction). As a result, it may be desirable to perform one or more actions to compensate (logically undo) such work if the transaction fails. For example, this enables some consistency to be maintained between the transactional and non-transactional resources. For this purpose a compensation service may be used which initiates compensation if a transaction fails. To make use of a compensation service an application is written which includes a transaction to be run to process a message and associated compensation actions to be run if the transaction fails. In this way the compensation action(s) may be written to compensate correctly for non-transactional work done in the transaction. Now in the event the transaction fails when processing a message, after each of the transactional resources have been directed to rollback, the compensation service is invoked to run the compensation actions. Such actions could, for example, reverse an action (e.g.: by removing a record that was added to a file) or take alternative action (e.g.: by sending an additional e-mail to cancel the effects of a first e-mail), for an action taken by non-transactional work of the transaction.

However, when running a transaction which involves the processing of a message and compensation, if the transaction fails the message service is directed to roll back as part of transaction processing, whereas the compensation service is triggered as part of transaction completion. This means that the message is replaced onto the message queue before compensation is started, which leads to a timing problem because the message may be reprocessed on a different thread, or in a different process, before compensation of the non-recoverable resources has completed. For example this could result in the transaction which reprocesses the message working on uncompensated non-transactional data from the first transaction, for example in a flat file, which may result in it using invalid data and as a result working incorrectly and/or subsequently failing. Alternatively, for example, it could result in the transaction which reprocesses the message sending a second confirmation e-mail before a failure e-mail is sent as part of compensation of the first transaction.

SUMMARY

The present invention provides a data processing method, data processing apparatus, computer program product, and service, which ensure, for a transaction which processes a message and fails, that compensation of non-transactional resources involved in the transaction is completed before the message is reprocessed.

Accordingly, according to a first aspect the present invention provides a data processing method for assuring timely execution of compensation for non-transactional work carried out in a transaction under which a data item is processed, the method comprising: obtaining a lock before the data item is processed, wherein the lock is identified by an identifier associated with the data item; and responsive to an indication that the transaction failed, running compensation to compensate for non-transactional work carried out under the transaction; and releasing the lock after the compensation task is complete.

According to a second aspect the present invention provides a data processing apparatus for assuring timely execution of compensation for non-transactional work carried out in a transaction under which a data item is processed, the apparatus comprising: means for obtaining a lock before the data item is processed, wherein the lock is identified by an identifier associated with the data item; and means, responsive to an indication that the transaction failed, for running compensation to compensate for non-transactional work carried out under the transaction; and releasing the lock after the compensation task is complete.

According to a third aspect the present invention provides a data processing service for assuring timely execution of compensation for non-transactional work carried out in a transaction under which a data item is processed, wherein providing the service comprises carrying out the method steps of the first aspect.

According to a fourth aspect the present invention provides a computer program product comprising instructions which, when executed on a data processing host, cause the host to carry out a method according to the first aspect.

Note that a data item is any item of data which requires processing under the scope of a transaction. Such a data item is often referred to as a message.

Optionally, a specific component is responsible for obtaining and releasing the lock and such a component registers with the transaction service as a participant in the transaction. As a result, the indication that the first transaction failed is received as a result of being instructed by the transaction service to rollback.

The specific component could be any component involved in the processing of the data item, for example in a J2EE system which involves the processing of message it could be, for example, a message queue manager, a Java message service (JMS), an EJB container or a compensation service.

Optionally, the running of the compensation and release of the lock can be competed under a compensation task and further, such a task can be scheduled as a separate task from the transaction. As a result, the compensation task can be run asynchronously from the failed transaction, for example, on a different thread or in a different process.

BRIEF DESCRIPTION OF THE DRAWINGS

The invention will now be described, by way of example only, with reference to a preferred embodiment thereof, as illustrated in the accompanying drawings, in which.

In the figures, like reference numbers are used to denote like parts.

DETAILED DESCRIPTION

Figure 1:
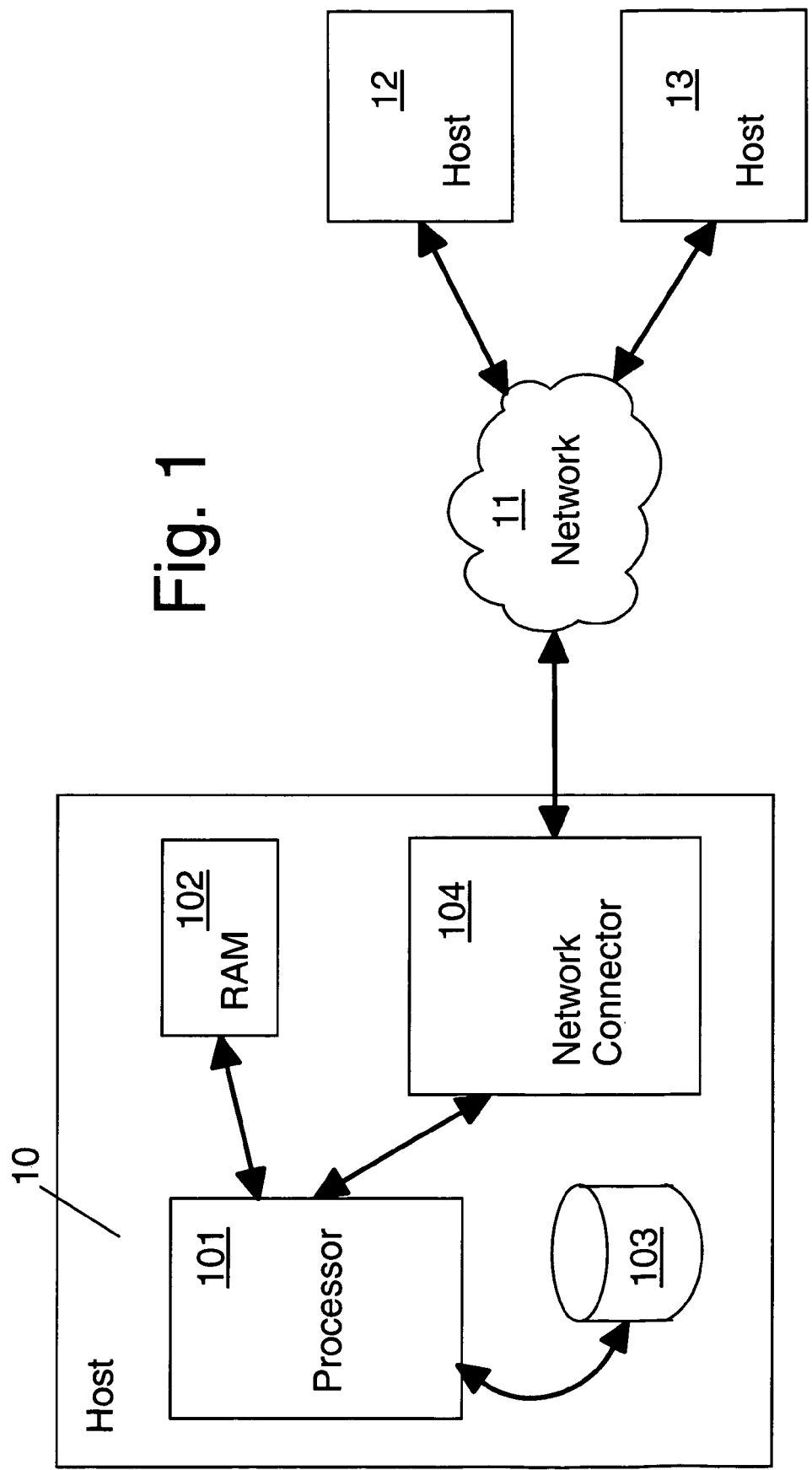
FIG. 1. is a schematic diagram of a data processing system in which a preferred embodiment of the present invention can be advantageously applied.

FIG. 1 is a block diagram of a data processing environment in which a preferred embodiment of the present invention can be advantageously applied. In FIG. 1, a client/server data processing host 10 is connected to other client/server data processing hosts 12 and 13 via a network 11, which could be, for example, the Internet. A transactional messaging system, such as provided by a J2EE implementation with JMS support, may be installed on any such client/server and accept messages to process from any other client/servers. Client/server 10 has a processor 101 for executing programs that control the operation of the client/server 10, a RAM volatile memory element 102, a non-volatile memory 103, and a network connector 104 for use in interfacing with the network 11 for communication with the other client/servers 12 and 13.

Figure 2:
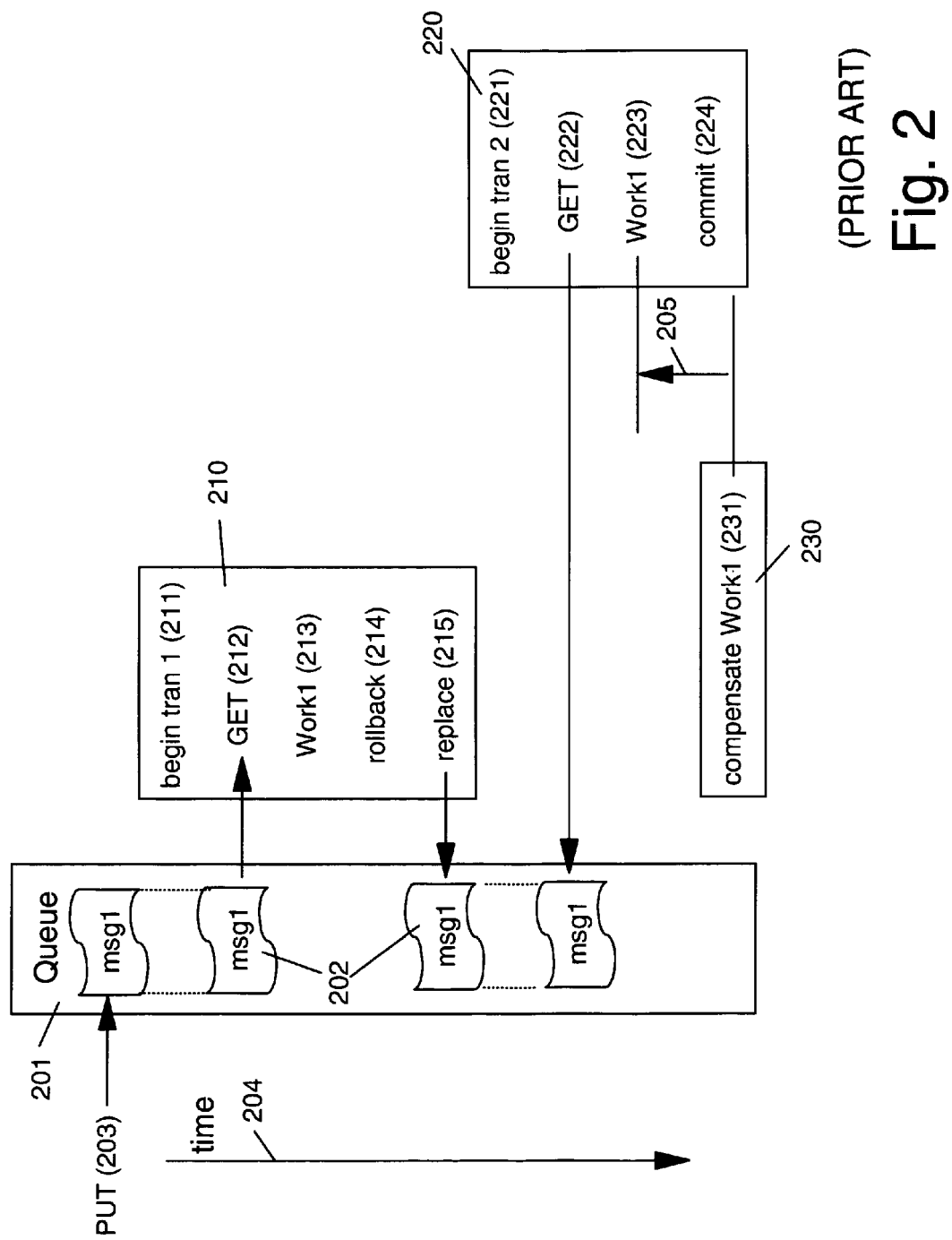
FIG. 2. is a schematic diagram of an example of the processing of a message in a transaction which fails, the retry of that transaction, and the compensation of the transaction, according to the prior art.

FIG. 2 is a schematic diagram of an example of the processing of a message in a transaction which fails, the retry of that transaction, and the compensation of the transaction, according to the prior art. Note that the figure illustrates a series of events in time order from top to bottom of the figures as indicated by arrow 204. The figure shows a message queue 201 to which a message msg1_202 is put (203). The put of the message triggers a transaction to be started to process the message. The transaction 210 is begun (211) and then issues a GET (212) to obtain the message for processing and as a result the message service registers a resource (not shown) as a participant in the transaction. The message is then processed, such processing including performance of some non-transactional work, Work1 (213), which is the adding of data relating to the processing of the message to a flat file. Then for some reason, of which there could be many, the transaction fails, and the registered participants are instructed to rollback (214). Such a participant is the resource of the messaging service which then, as part of its rollback processing, replaces (215) the message msg1_202 onto the message queue 201.

When the transaction completes it triggers a compensation task 230 which compensates (231) for the non-transactional work, Work1, carried out in tran 1. Compensation involves removing data which relates to the message and which was previously added to the flat file.

Further, shortly after the message was replaced on the queue, another transaction was started to process the replaced message in a retry transaction 220 which runs asynchronously to transaction 210. The retry transaction begins (221), gets (222) the replaced message from the queue, and re-performs (223) the non-transactional work (Work1).

Now, in this example, because the message was replaced onto the queue before the compensation task was started and was then quickly processed in retry transaction 220, Work1 has been re-performed (i.e.: added data relating to the processing of the message to a flat file) before the compensation task has been performed (as shown by arrow 205). Compensation involves removing data which relates to the message and which was previously added to the flat file and, consequently, this results in removal of the data added by both the original transaction 210 and retry transaction 210, leaving no record in the flat file that the message was ever processed. As a result, such a mis-ordering of performance of retried work and compensation of the original work is to be avoided.

Figure 3:
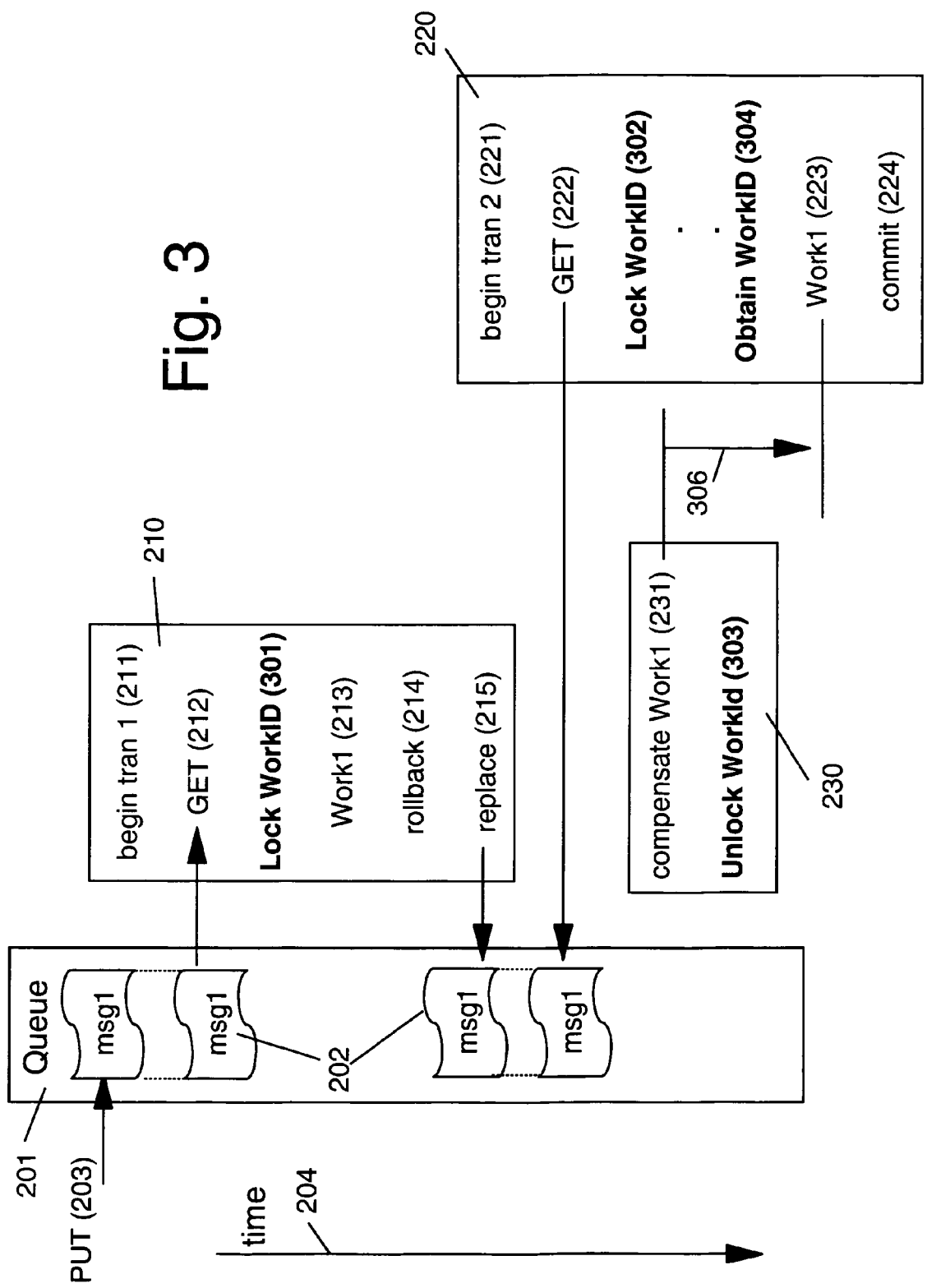
FIG. 3. is a schematic diagram of an example of the processing of a message in a transaction which fails, the retry of that transaction, and the compensation of the transaction, according to a preferred embodiment of the present invention.

FIG. 3 is a schematic diagram of an example of the processing of a message in a transaction which fails, the retry of that transaction, and the compensation of the transaction, according to a preferred embodiment of the present invention. Note that FIG. 3 is similar to FIG. 2, and that like parts are designated with like numbers. However there are several important differences, which will now be described.

Firstly, as part of transaction 210 a lock is obtained (301). The lock is identified using an identifier, WorkId, associated with the message and which is unique to the messages on the message queue. This identifier is assigned by the messaging service and is used by transaction 210 when getting (212) the message. The identifier may comprise, for example, one or more of: the name of the queue from which the message was obtained; a sequence number for the message; the time of receipt of the message; and an IP address associated with the queue. Transaction 220 then gets (212) the message as before, fails, and replaces the message on the queue. Note that because the transaction failed, transaction 220 does not unlock the previously obtained lock.

Secondly, as part of the retry transaction 220 which is started to reprocess the message, an attempt is made to obtain a lock (302) which is identified using the WorkId identifier associated with the message. However, because this lock is still locked by the original transaction 210, the retry transaction waits for the lock.

Finally, as part of the compensation task 230, after the compensation action for Work1 has been performed, the lock associated with identifier WorkId, and obtained by transaction 210, is unlocked. This indicates completion of the compensation task and frees the lock such that it can now be obtained by the retry transaction 220. As a result, the retry transaction 220 now obtains the lock (304) which was previously requested, and can now continue to reprocess the message.

Now, in this example, the transaction 210 and retry transaction 220, prior to processing the message, obtain a lock associated with the message. However, in the event of failure, the lock obtained by transaction 210 is only released by the compensation task 230 after the compensation has completed. This means that the retry transaction 220 has to wait for the lock until the compensation task completes and, as a result, the compensation (231) of the non-transactional work, Work1 (213), of transaction 210 is completed before the work is redone (223), as indicated by arrow 306.

Note that in the example transaction 210 would release the lock if the transaction was successful and as a result no compensation task was necessary.

Figure 4:
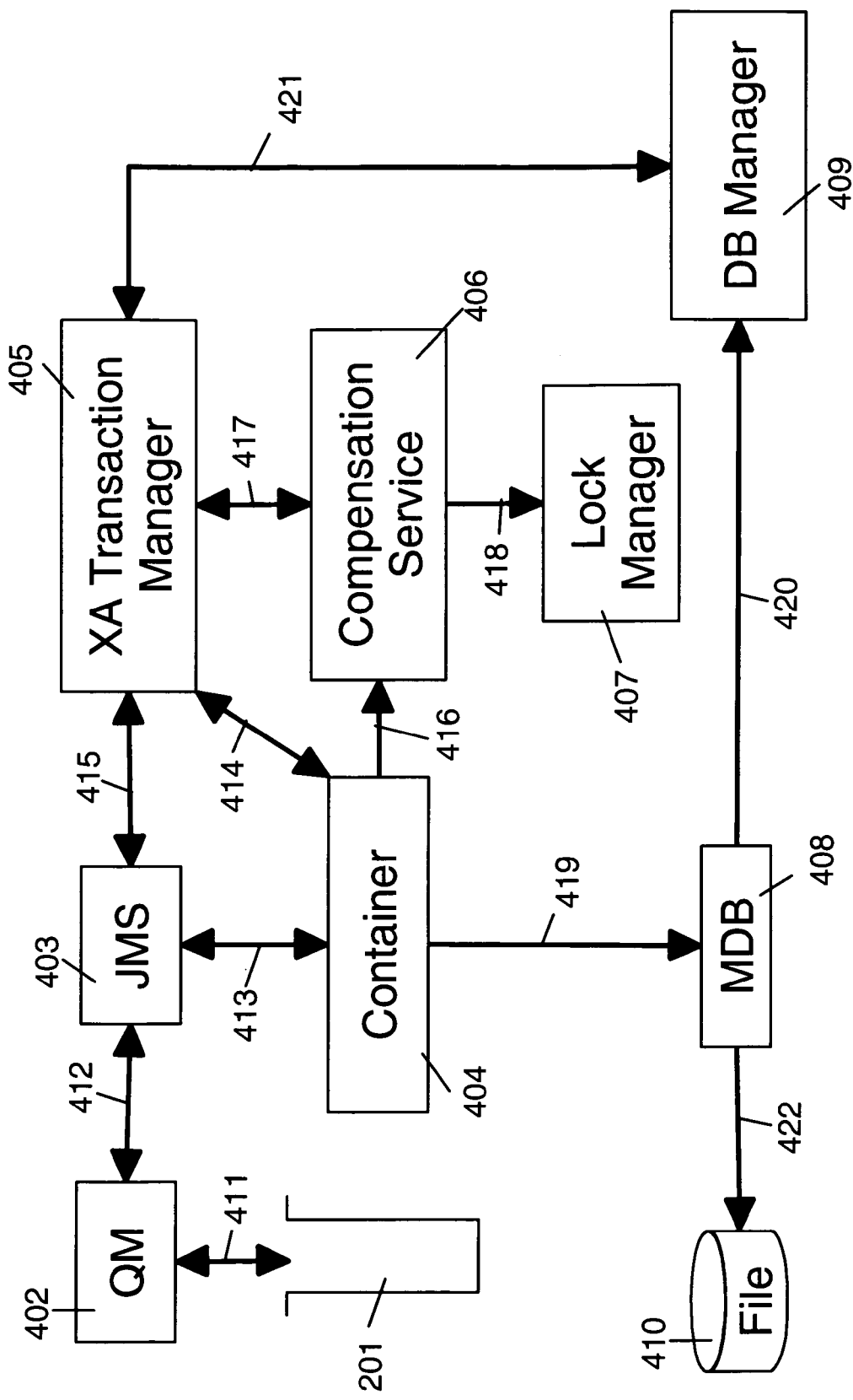
FIG. 4. is a schematic diagram which shows the components and interactions of a system involved in the processing of a message according to FIG. 3.

A preferred embodiment is based on a J2EE system with a JMS, an EJB Container, an XA transaction manager and a compensation service. Accordingly, FIG. 4 is a schematic diagram which shows the components and interactions of such a system when processing a message. However, note that not all of the interactions are described, but only those relevant to an explanation of the preferred embodiment of the present invention. The diagram shows a message queue 201, which is managed by a Queue Manager 402. The Queue Manager puts and gets (411) messages to and from the queue when asked to do so. The JMS 403 and the Queue Manger 402 communicate (412). The JMS registers with the Queue Manager and as a result is informed by the Queue Manager when a new message arrives on the queue. The JMS also obtains messages from the queue via the Queue Manager when directed to do so by Container 404.

The JMS communicates (413) with the Container 404. When the JMS becomes aware of a new message it informs the Container, which then coordinates processing of the message. The Container communicates (414) with the XA Transaction Manager 405. When informed of the arrival of a new message by the JMS, the Container begins a transaction with the XA Transaction Manager and further registers as a synchronization object in the transaction which it has begun. Registering in this way means that the XA Transaction Manager will inform the container just before and just after transaction completion starts and finishes, respectively. Note that the transaction started is the transaction under which the message will be processed.

Having started a transaction, the Container 404 requests the JMS 403 to get the message which has arrived and return it to the Container. The JMS communicates (415) with the XA Transaction Manager 405, and as part of the processing of this request the JMS, registers, with the XA Transaction Manager, as a participant in the transaction. Registering in this way means that the JMS will be involved in completion processing of the transction. The JMS then returns the message to the Container together with a message identifier which uniquely identifies the message.

The Container also communicates (416) with the Compensation service 406. After obtaining the message to process from the JMS, the Container informs the Compensation Service that the message is being processed and provides the message identifier. The Compensation service communicates (417,418) with the XA transaction manager 405 and Lock Manager 407. When informed that a message is being processed, the compensation service registers with the XA transaction service as a participant in the transaction under which the message is being processed, and then requests the lock manager to obtain a lock associated with the message identifier. Registering as a participant in the transaction in this way means that the compensation service will be informed of the outcome of the transaction during transaction completion. The compensation service then returns to the Container 404.

The Container then creates, or obtains from a pool, a Message Driven Bean (MDB) 408 to process the message. Having created or obtained the MDB, the Container passes (419) the message to it for processing. The MDB then processes the message under the scope of the transaction started by the container. In this example, this processing involves updating (420) a transactional database via a Database Manager 409 and adding (422) data to a non-transactional flat file 410. The database is transactional, and as a result the Database Manager 409 registers (421) as a participant in the transaction under which the message is being processed. This ensures that it is subsequently involved in completion processing of the transaction. However, the flat file 410 is non transactional and cannot register as a participant in the transaction. As a result, a compensation task is defined which is to be run in the event that the transaction fails in order to remove the data added to the flat file 410. Such a compensation task is defined, for example, by an application developer in conjunction with the definition of the MDB which is used to process the message.

When the MDB completes processing of the message it returns to the Container 404. The container then, depending on whether or not processing of the message was successful, directs the XA transaction manager 405 to either commit (message processing succeeded) or rollback (message processing failed) the transaction.

If the XA transaction manager is directed to commit, it first sends a prepare request to each of the registered participants, which in this case is the JMS 403, the Database manager 409, and the Compensation service 406, to which the participants return a vote of either commit or rollback. If any participant votes rollback, the XA transaction manager decides to rollback the transaction and if all participants vote commit the XA transaction manager decides to commit the transaction.

If the decision is to commit, the XA transaction Manager 405 directs each registered participant to commit. In response to this the JMS 403 ensures that the message cannot be reprocessed, the DB manager 409 completes the updates to the database made by the MDB 408 when processing the message, and the compensation service directs the Lock Manager to release the lock associated with the message identifier which it previously obtained.

If the decision is to rollback, or the container directed the XA transaction rollback as a result of message processing having failed, the XA Transaction Manager 405 directs each registered participant to rollback (although a participant which voted rollback in response to prepare is not normally called because it completes its rollback processing as part of the prepare request). In response to a rollback request, the JMS 403 replaces the message onto the queue for reprocessing, the Database Manager 409 backs out changes made to the database as part of the transaction, and the compensation service first runs the defined compensation task associated with the MDB which processed the message and then directs the Lock Manager to release the lock associated with the message identifier which it previously obtained. The compensation task removes the data from the flat file which was previously added.

Note that as a result of JMS 403 replacing the message onto the queue as part of rollback processing, the queue manager 402 informs the JMS that the message is available for processing and the message is then reprocessed in the same manner as if it were the original message and using the same message identifier. In this situation, because the compensation service obtains a lock using the message identifier before the message is reprocessed, the message cannot be reprocessed until, during rollback processing of the original transaction, the compensation service releases the lock.

Figure 5:
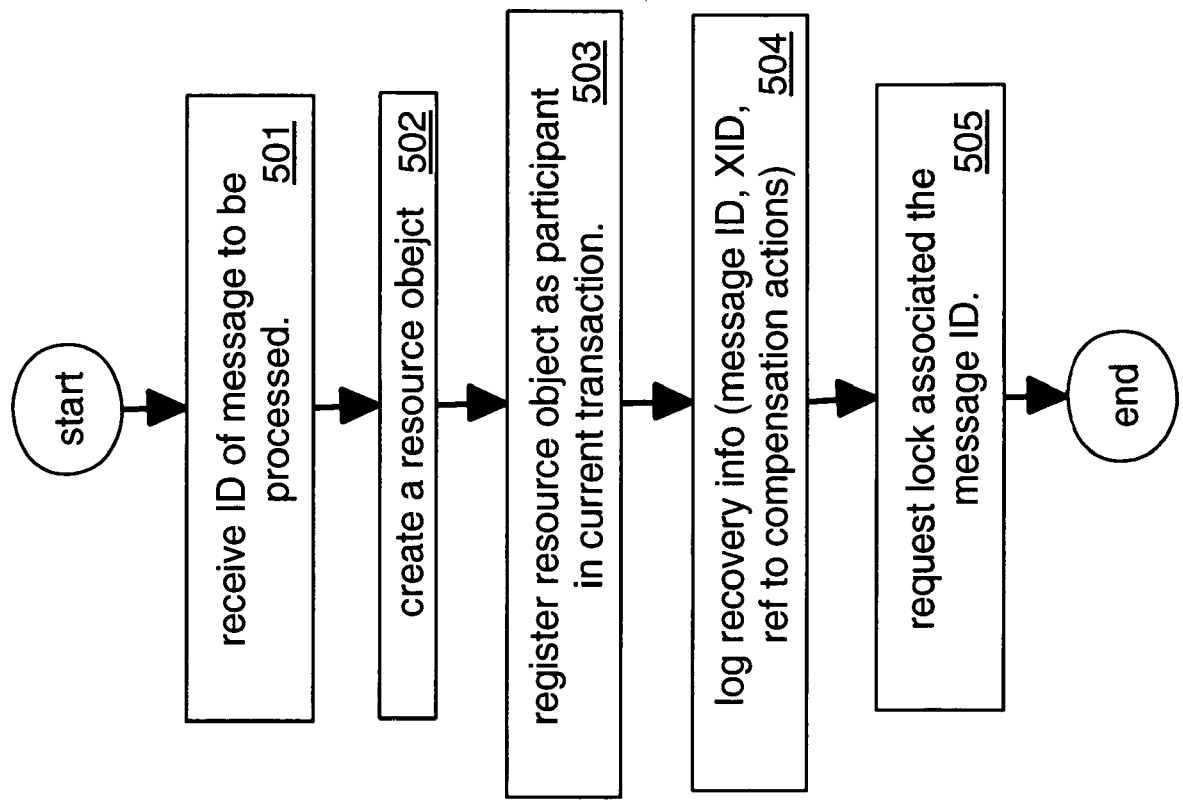
FIG. 5 is a flow diagram of the method followed by a compensation service when it is informed by a container that a message is to be processed.

FIG. 5 is a flow diagram of the method followed by the compensation service (406 of FIG. 4) when it is informed by the container (404 of FIG. 4) that a message is to be processed. Note that this processing will be completed both for the first processing of a message and any subsequent retry of the processing of the message in the event that the previous attempt failed. At a step 501 the message identifier is received from the container. As a result of this, the compensation service, at step 502, creates a resource object, and then at step 503, registers the resource object as a participant in the current transaction, that is the transaction under which the message is being processed, with the XA transaction manager (405 of FIG. 4). The resource object will now be involved in transaction completion by the XA transaction manager. At step 504 the compensation service logs recovery information for the resource object, such information comprising information to enable the resource object to be re-created, for example the message identifier, the ID of the current transaction (XID), and a reference to the compensation action to be carried out in the event of failure. Note that step 504 makes the resource object persistent and therefore recoverable in the event of a system failure, which is generally a requirement for a resource to act as a participant in a transaction. Finally at step 505, before returning to the container, a request is made to a lock manager to obtain a lock associated with the message ID. Note that if this is a subsequent attempt to process the message, the previous attempt may still have the lock locked, in which case this request will wait until the lock is subsequently unlocked. Further note that the lock is also persistent (and therefore recoverable) in that if the system fails when the lock is locked, on restart the Lock Manager will still have knowledge of the lock and the fact that it is locked. The compensation service then returns to the container.

Figure 6:
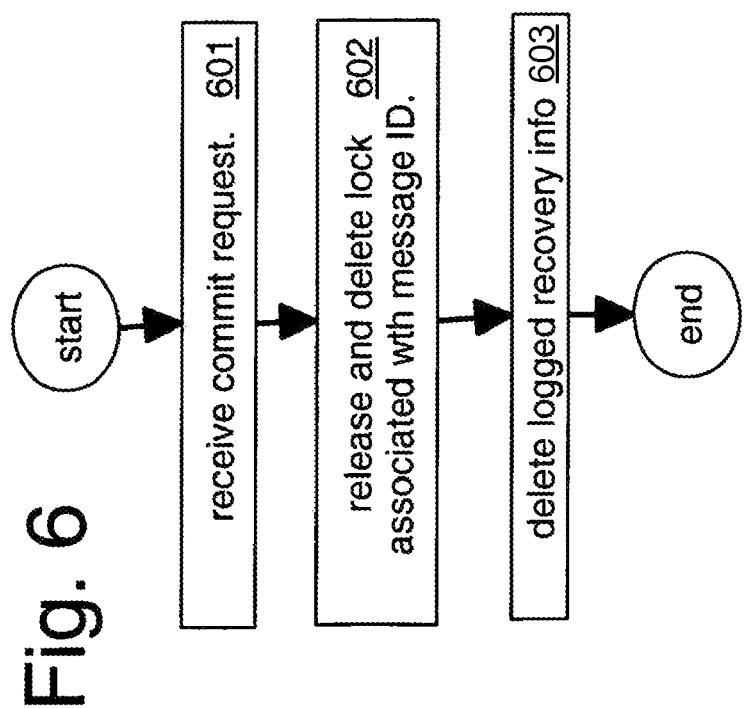
FIG. 6 is a flow diagram of the method followed by a resource object, which was created in the method of FIG. 5, when directed to commit by a transaction manager.

FIG. 6 is a flow diagram of the processing which the resource object, created at step 502 of FIG. 5, carries out when directed to commit by the XA transaction manager (405 of FIG. 4). At step 601 the commit request is received, and as a result, at step 602, the lock manager is called to release and delete the lock obtained at step 505 of FIG. 5. Finally, at step 603, the recovery information logged at step 504 of FIG. 5 is deleted, or marked as redundant, because it is no longer required. The resource object then returns from the request.

Figure 7:
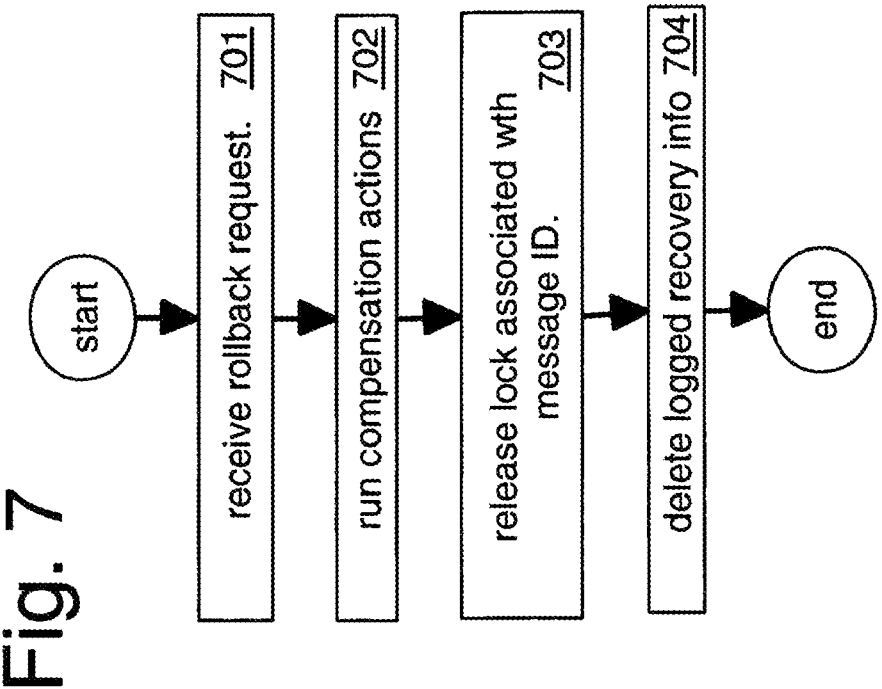
FIG. 7 is a flow diagram of the method followed by a resource object, which was created in the method of FIG. 5, when directed to rollback by a transaction manager.

FIG. 7 is a flow diagram of the processing which the resource object, created a step 502 of FIG. 5, carries out when directed to rollback by the XA transaction manager (405 of FIG. 4). At step 701 the rollback request is received, and as a result at step 702 the compensation actions associated with the failed transaction are carried out, for example, with reference to FIG. 5 the data added to flat file 410 by the MDB 408 when processing the message. Having completed the compensation actions, at step 703 the lock manager is called to release, but not delete, the lock obtained at step 505. As a result of releasing this lock, any attempt to get the lock at step 505 of FIG. 5 as part of a subsequent attempt to process the message will now succeed. Note that the lock will be deleted by step 602 of FIG. 6 when processing of the message succeeds. Finally, at step 704 the recovery information logged at step 504 of FIG. 5 is deleted, or marked as redundant, because it is no longer required. The resource object then returns to the XA transaction service.

Note that in FIG. 7, steps 702 and 703 and 704 could be run asynchronously from the remaining steps in a separate task. For example on receipt of the rollback request the compensation service can schedule a separate task to carry out the compensation action, release the lock, and remove the recovery information. Once the task is scheduled, the compensation then returns to the XA transaction service.

Note that in this particular embodiment the compensation service is the component responsible for obtaining and releasing the lock which is used to ensure that the compensation task is run before the message is re-reprocessed. In another embodiment, a different component could perform this function, for example the message queue manager, the Java message service (JMS), or the EJB container, and accordingly such a component would perform the methods of FIGS. 5, 6 and 7.

In summary, according to this embodiment, in order to reliably initiate compensation when a transaction rolls back, and provide a way to ensure that compensation of non-recoverable resources is complete before retry of the failed transaction is attempted, the compensation service to acts as a resource (participant) in the transaction, and has its own persistence mechanism. As a result, even if a transaction is initially directed to commit but ultimately rolls back because one of the other participants is unable to prepare, the compensation service resource is reliably directed to rollback and can initiate compensation for the non-recoverable work which was performed by the application. The compensation logic itself is provided, for example, by the application developer and identified through product tooling. The compensation service persists its resource, along with the information needed to invoke the correct application (compensating) logic in an appropriate environment, so that compensation can be performed even in the event of transaction rollback due to a system failure.

However, enlisting as a resource in the same transaction does not guarantee that compensation will be performed before the message has been replaced on the queue and a retry is attempted. This is because an XA Transaction Manager, and typically any other transaction manager, does not provide a mechanism to force the ordering of resources which are called during completion processing. Further even if such ordering was provided this will not be sufficient if, for example, the JMS resource performs rollback during its prepare call (which it is quite at liberty to do), or compensation processing takes place asynchronously with respect to the rollback call of the compensation service resource. Accordingly, a locking mechanism is used to protect the non-recoverable resources from any access by the retry process, until compensation is complete. The lock is taken before the MDB is first invoked with the message and this is possible because the EJB Container calls the compensation service before the MDB is invoked to process the message. The compensation service then takes an exclusive lock-based on the unique identifier of the message, preventing any retry from proceeding past the same point until that lock is released. The logic to release the lock is in the resource that the compensation service enlists with the transaction, and is executed either when the resource is directed to commit (in which case compensation is not needed) or when the resource has been directed to rollback and has completed all compensation processing. The lock is also persistent—it is not released in the event of a system failure until the compensation resource is directed to commit or rollback.

The methods described with reference to FIGS. 3, 4, 5, 6 and 7 may be implemented in a variety of programming languages, for example, Java™, C, and C++ (Java is a registered trademark of Sun Microsystems, Inc. in the United States, other countries, or both.). Once implemented, the methods can be stored in a computer program product comprising one or more programs, in source or executable form, on a media, such as floppy disk, CD, and DVD, suitable for loading onto a data processing host and causing the data processing host to carry out the methods. The methods described with reference to FIGS. 5, 6 and 7 may be embodied in a data processing apparatus, and further used in providing a compensation service.

Accordingly, the present invention provides a data processing method, an apparatus, computer program product, and a service, for assuring timely execution of compensation for non-transactional work which is carried out in a transaction under which a data item is processed. According to the invention, a lock is taken before the data item is processed and, in the event the transaction fails, the same lock is also obtained before the data item is re-processed. As a result, re-processing of the data item is held until the lock obtained by the failed transaction is released and this is only done once compensation of non-transactional work is complete. As a result, compensation completes before the message is re-processed.

We claim:

1. A computer implemented data processing method for compensating for non-transactional work carried out in a transaction under which a data item is processed, the method comprising:
   electrically obtaining a lock before the data item is processed by a first thread, wherein the lock restricts reprocessing of the data item by a second thread until the lock is released;
   electrically responsive to an indication that the transaction failed, compensating for non-transactional work carried out under the transaction;
   electrically releasing the lock after compensating for non-transactional work is complete; and
   electrically reprocessing the data item by the second thread.

2. The computer implemented method of claim 1 further comprising registering a compensation service with a transaction service as a participant in the transaction, wherein the transaction outcome is received by the compensation service; if the transaction outcome is to commit, the compensation service releases the lock; if the transaction outcome is to rollback, the compensation service compensates for non-transactional work and then releases the lock.

3. The computer implemented method of claim 1, further comprising, responsive to an indication that the transaction failed, scheduling a compensation task, wherein running compensation and releasing the lock are carried out as part of the scheduled compensation task.

4. A data processing apparatus for compensating for non-transactional work carried out in a transaction under which a data item is processed, the apparatus comprising:
   means for obtaining a lock before the data item is processed by a first thread, wherein the lock restricts reprocessing of the data item by a second thread until the lock is released;
   means responsive to an indication that the transaction failed for compensating for non-transactional work carried out under the transaction,
   wherein the lock is released after compensation is complete; and means for reprocessing the data item by the second thread.

5. The data processing apparatus of claim 4 further comprising means
   for registering a number of components with a transaction service as participants in the transaction, wherein the means responsive to an indication that the transaction failed is responsive to an instruction from the transaction service to rollback based on at least one of the number of components requesting rollback.

6. The data processing apparatus of claim 4, wherein the means responsive to an indication that the transaction failed schedules a compensation task; wherein running compensation and releasing the lock are carried out by the compensation task.

7. A computer implemented data processing service method for compensating for non-transactional work carried out in a transaction under which a data item is processed, wherein providing the service comprises:
   electrically registering a compensation service with a transaction manager as a participant in the transaction;
   the compensation service electrically obtaining a lock before the data item is processed by a first thread, wherein the lock restricts reprocessing of the data item by a second thread until the lock is released;
   responsive to an indication that the transaction failed, the compensation service electrically compensating for non-transactional work carried out under the transaction; and
   electrically releasing the lock after compensation is complete.

8. The computer implemented data processing service method of claim 7, wherein the indication that the transaction failed is received as a result of being instructed by the transaction service to rollback.

9. The computer implemented data processing service of claim 7, wherein providing the service further comprises, responsive to an indication that the transaction failed, scheduling a compensation task, wherein running compensation and releasing the lock are carried out as part of the scheduled compensation task.

10. The computer implemented data processing service method of claim 7, further comprising a second thread configured to reprocess the transaction following the release of the lock by the compensation service.

11. The computer implemented data processing service method of claim 10, wherein the second thread obtains a second lock associated with reprocessing the transaction.

12. The computer implemented data processing service method of claim 7, wherein the compensation service obtains and releases the lock via a lock manager.

* * * * *